United States Patent
Minamide et al.

(10) Patent No.: US 9,670,354 B2
(45) Date of Patent: Jun. 6, 2017

(54) THERMOPLASTIC POLYMER COMPOSITION AND MOLDED ARTICLE

(75) Inventors: Asako Minamide, Ibaraki (JP); Mikio Masuda, Ibaraki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 13/818,695

(22) PCT Filed: Aug. 24, 2011

(86) PCT No.: PCT/JP2011/069092
§ 371 (c)(1),
(2), (4) Date: Feb. 25, 2013

(87) PCT Pub. No.: WO2012/026501
PCT Pub. Date: Mar. 1, 2012

(65) Prior Publication Data
US 2013/0157069 A1    Jun. 20, 2013

(30) Foreign Application Priority Data
Aug. 27, 2010    (JP) .................................. 2010-191134

(51) Int. Cl.
| | | |
|---|---|---|
| *C08L 53/02* | (2006.01) | |
| *C08L 51/06* | (2006.01) | |
| *B32B 17/10* | (2006.01) | |
| *B32B 27/08* | (2006.01) | |
| *B32B 15/08* | (2006.01) | |
| *B32B 17/06* | (2006.01) | |
| *C08L 29/14* | (2006.01) | |
| *C09J 153/02* | (2006.01) | |
| *C08L 23/26* | (2006.01) | |
| *C09J 123/26* | (2006.01) | |
| *C08L 23/10* | (2006.01) | |
| *C09J 123/10* | (2006.01) | |

(52) U.S. Cl.
CPC .............. *C08L 53/02* (2013.01); *B32B 15/08* (2013.01); *B32B 17/064* (2013.01); *B32B 17/10* (2013.01); *B32B 17/10018* (2013.01); *B32B 27/08* (2013.01); *C08L 23/10* (2013.01); *C08L 23/26* (2013.01); *C08L 29/14* (2013.01); *C08L 51/06* (2013.01); *C08L 53/025* (2013.01); *C09J 123/10* (2013.01); *C09J 153/02* (2013.01); *C09J 153/025* (2013.01); *Y10T 428/31667* (2015.04); *Y10T 428/31696* (2015.04); *Y10T 428/31931* (2015.04)

(58) Field of Classification Search
CPC ..... Y10T 428/31696; Y10T 428/31931; Y10T 428/31667; C08L 23/10; C08L 23/26; C08L 29/14; C08L 53/025; C08L 51/06; C09J 123/10; C09J 153/02; C09J 153/025; B32B 17/064; B32B 15/08; B32B 17/10; B32B 17/10018; B32B 27/08
See application file for complete search history.

(56) References Cited

U.S. PATENT DOCUMENTS

| | | | | |
|---|---|---|---|---|
| 4,556,690 | A | * | 12/1985 | Nakagawa ...................... 525/64 |
| 4,877,685 | A | * | 10/1989 | Bergstrom et al. ........... 428/500 |
| 5,854,324 | A | * | 12/1998 | Tajima et al. ................ 524/232 |
| 6,284,828 | B1 | * | 9/2001 | Takayama ..................... 524/413 |
| 2005/0159548 | A1 | * | 7/2005 | Ibar ................................. 525/96 |
| 2008/0207829 | A1 | * | 8/2008 | Hofmann et al. ............... 525/57 |
| 2010/0075132 | A1 | | 3/2010 | Waid et al. |
| 2010/0174027 | A1 | | 7/2010 | Sasaki et al. |
| 2010/0273012 | A1 | | 10/2010 | Moriguchi et al. |
| 2013/0090420 | A1 | | 4/2013 | Kuwahara et al. |

FOREIGN PATENT DOCUMENTS

| | | | |
|---|---|---|---|
| EP | 1 101 796 | A1 | 5/2001 |
| EP | 2 223 965 | A1 | 9/2010 |
| JP | 60-038445 | * | 2/1985 |
| JP | 6 325005 | | 11/1994 |
| JP | 9 156035 | | 6/1997 |
| JP | 2006 206715 | | 8/2006 |
| JP | 2006 274158 | | 10/2006 |
| JP | 2006 291019 | | 10/2006 |
| JP | 2008 120929 | | 5/2008 |
| JP | 2009 227844 | | 10/2009 |
| JP | 2010 1364 | | 1/2010 |
| JP | 2010 512426 | | 4/2010 |
| WO | 2007 122995 | | 11/2007 |
| WO | 2009 081877 | | 7/2009 |

OTHER PUBLICATIONS

Melt-flow rate-intrinsic viscosity correlation of polypropylene; Baijal & Sturm, Journal of Applied Polymer Science; vol. 14 (1970).*
International Search Report Issued Nov. 8, 2011 in PCT/JP11/69092 Filed Aug. 24, 2011.
U.S. Appl. No. 13/812,359, filed Jan. 25, 2013, Minamide, et al.
U.S. Appl. No. 13/808,688, filed Mar. 15, 2013, Minamide, et al.
Extended European Search Report issued Apr. 24, 2014 in Patent Application No. 11819964.5.

* cited by examiner

*Primary Examiner* — Kevin R Kruer
(74) *Attorney, Agent, or Firm* — Oblon, McClelland, Maier & Neustadt, L.L.P.

(57) ABSTRACT

A thermoplastic polymer composition which is excellent in flexibility, mechanical properties, moldability, and particularly in heat resistance and is capable of adhering to ceramics, metals, and synthetic resins even at low temperature (for example, 190° C. or lower) without the treatment with a primer, and a molded product produced by using the thermoplastic polymer composition are described. The thermoplastic polymer composition includes 100 parts by mass of a thermoplastic elastomer (A), 1 to 100 parts by mass of a polyvinyl acetal resin (B), and 5 to 100 parts by mass of a polar group-containing polypropylene resin (C). The thermoplastic elastomer (A) is a block copolymer which is constituted by a polymer block including aromatic vinyl compound units and a polymer block including isoprene units, butadiene units, or isoprene/butadiene units wherein the total of a content of 1,2-bonding and a content of 3,4-bonding is 40 mol % or more, or the thermoplastic elastomer (A) is a hydrogenated product of the block copolymer.

20 Claims, No Drawings

THERMOPLASTIC POLYMER COMPOSITION AND MOLDED ARTICLE

CROSS REFERENCE TO RELATED APPLICATIONS

The present application is a 35 U.S.C. §371 national stage patent application of International patent application PCT/JP2011/069092, filed on Aug. 24, 2011, published as WO/2012/026501 on Mar. 3, 2012, the text of which is incorporated by reference, and claims the benefit of the filing date of JP 2010-191134, filed on Aug. 27, 2010, the text of which is also incorporated by reference.

TECHNICAL FIELD

The present invention relates to thermoplastic polymer compositions which are excellent in flexibility, mechanical properties, moldability, and particularly in heat resistance and capable of adhering to ceramics, metals and synthetic resins at low temperatures without treatment with a primer and other treatments and also relates to molded products produced by using the thermoplastic polymer compositions.

BACKGROUND ART

Ceramics, metals, and synthetic resins have been widely used for electrical home appliances, electronic parts, machine parts, automotive parts, and other uses, because they are excellent in durability, heat resistance, and mechanical strength. In some cases, these materials are adhered to or made into composite with an elastomeric material excellent in flexibility according to their uses, other constituting parts, and methods of use, for example, for fixing these materials to other structural members, absorbing shock, preventing damages, and sealing.

As such elastomeric material, a styrene-based thermoplastic elastomer excellent in flexibility, mechanical properties, and moldability can be suitably used. The styrene-based thermoplastic elastomer referred to herein is a block copolymer having a polymer block constituted by aromatic vinyl compound units and a polymer block constituted by conjugated diene units and a hydrogenated product of the block copolymer. However, since the adhesion strength of the styrene-based thermoplastic elastomer to ceramics and metals are poor because of its low polarity, the styrene-based thermoplastic elastomer cannot be fuse-bonded to these materials without an additional treatment. To eliminate this problem, several methods have been proposed, in which the surface of ceramics, metals, or synthetic resins is coated with an adhesive or treated with a primer before adhering the styrene-based thermoplastic elastomer to ceramics, metals, or synthetic resins (Patent Documents 1 to 6).

However, the methods disclosed in Patent Documents 1 to 6 include complicated steps and also the productivity is low to increase production costs.

To eliminate this problem, a thermoplastic polymer composition containing a styrene-based thermoplastic elastomer and a polyvinyl acetal, which is excellent in adhesion to ceramics, metals, and synthetic resins, is proposed (Patent Document 7). The proposed thermoplastic polymer composition adheres to ceramics, metals, and synthetic resins only by heat treatment without adhesive or treatment with a primer.

PRIOR ART DOCUMENTS

Patent Documents

Patent Document 1: JP 2006-291019A
Patent Document 2: JP 2006-206715A
Patent Document 3: JP 63-25005A
Patent Document 4: JP 9-156035A
Patent Document 5: JP 2009-227844A
Patent Document 6: JP 2010-1364A
Patent Document 7: WO 2009/081877

SUMMARY OF THE INVENTION

Problems to be Solved by the Invention

The thermoplastic polymer composition disclosed in Patent Document 7 is excellent in flexibility, mechanical properties, moldability, and adhesion. However, a molded product is produced by adhering the thermoplastic polymer composition to ceramics, metals, or synthetic resins at high temperature of 200° C. or higher (particularly, 240° C. or higher for adhering to ceramics or metals). As a result of extensive research, the inventors have found that the thermoplastic polymer composition disclosed in Patent Document 7 does not exhibit a sufficient adhesion at 180° C. or lower. In an injection molding machine or an extruder, the thermoplastic polymer composition is molten by heating to 200° C. or higher. Immediately after the discharge, the surface of the discharged composition is cooled to 200° C. or lower, thereby likely to reduce the adhesion ability. Therefore, it is necessary to maintain the temperature of the discharged resin at 200° C. or higher by heating with an additional heater which is installed into an existing injection molding machine or extruder. Since many of the members made of synthetic resins are generally molten or deformed at temperature as high as 200° C. or higher, the member around the portion to be adhered is damaged by heating.

In addition, the inventors have found that the adhesion of the thermoplastic polymer composition actually disclosed in the working examples of Patent Document 7 to ceramics, metals, and synthetic resins is reduced to a level insufficient for practical use, when a molded product in which the thermoplastic polymer composition is adhered to ceramics, metals, and synthetic resins is kept in an environment at 60° C. or higher (80° C. or higher and particularly 80 to 90° C.). For example, the automotive parts made of such molded products are frequently exposed to a high temperature environment at 60° C. or higher in summer. Therefore, the thermoplastic polymer composition and molded product actually disclosed in Patent Document 7 leave room for further improvement in view of the heat resistance.

The present invention has been made in view of the above problems and intends to provide a thermoplastic polymer composition which is excellent in flexibility, mechanical properties, moldability, and particularly in heat resistance and is capable of adhering to ceramics, metals, and synthetic resins even by the heat treatment at low temperature (for example, 190° C. or lower) without the treatment with a primer, and also provide a molded product produced by using the thermoplastic polymer composition.

Means for Solving the Problems

As a result of extensive research, the inventors have found that the above problems are solved by a thermoplastic polymer composition comprising a thermoplastic elastomer (A), a polyvinyl acetal resin (B), and a polar group-containing polypropylene resin (C) in specific blending ratios, wherein the thermoplastic elastomer (A) is a block copolymer which comprises a polymer block comprising aromatic vinyl compound units and a polymer block comprising isoprene units, butadiene units, or isoprene/butadiene units wherein a total of a content of 1,2-bonding and a content of 3,4-bonding is 40 mol % or more, or a hydrogenated product of the block copolymer. The inventors have further found that the moldability is further improved by blending a tackifier resin (E) to the thermoplastic polymer composition in a specific blending ratio.

Namely, the present invention provides:
(1) a thermoplastic polymer composition comprising 100 parts by mass of a thermoplastic elastomer (A), 1 to 100 parts by mass of a polyvinyl acetal resin (B), and 5 to 100 parts by mass of a polar group-containing polypropylene resin (C), wherein the thermoplastic elastomer (A) is a block copolymer which comprises a polymer block comprising aromatic vinyl compound units and a polymer block comprising isoprene units, butadiene units, or isoprene/butadiene units wherein a total of a content of 1,2-bonding and a content of 3,4-bonding is 40 mol % or more, or the thermoplastic elastomer (A) is a hydrogenated product of the block copolymer;
(2) the thermoplastic polymer composition of item 1, comprising 100 parts by mass of the thermoplastic elastomer (A), 5 to 70 parts by mass of the component (B), and 5 to 70 parts by mass of the component (C);
(3) the thermoplastic polymer composition of item 1 or 2, further comprising 0.1 to 300 parts by mass of a softener (D);
(4) the thermoplastic polymer composition of any one of items 1 to 3, further comprising 1 to 100 parts by mass of a tackifier resin (E);
(5) the thermoplastic polymer composition of any one of items 1 to 4, wherein the polyvinyl acetal resin (B) is obtained by acetalizing a polyvinyl alcohol having an average degree of polymerization of 100 to 4,000 to a degree of acetalization of 55 to 88% by mole;
(6) the thermoplastic polymer composition of any one of items 1 to 5, wherein the polyvinyl acetal resin (B) is a polyvinyl butyral;
(7) the thermoplastic polymer composition of any one of items 1 to 6, wherein the polar group-containing polypropylene resin (C) is a carboxylic acid-modified polypropylene resin;
(8) a molded product comprising the thermoplastic polymer composition of any one of items 1 to 7;
(9) the molded product of item 8, wherein the thermoplastic polymer composition is adhered to at least one material selected from ceramics, metals, and synthetic resins;
(10) the molded product of item 9, wherein the thermoplastic polymer composition is adhered to at least one material selected from ceramics and metals; and
(11) the molded product of item 8, wherein ceramics, metals, synthetic resins, or at least two materials selected from ceramics, metals, and synthetic resins are adhered to each other via the thermoplastic polymer composition.

Effects of the Invention

The thermoplastic polymer composition of the invention is excellent in flexibility, mechanical properties, and moldability, particularly in heat resistance. The molded product produced by adhering the thermoplastic polymer composition to ceramics, metals, or synthetic resins maintains adhesion strength sufficient for practical use, for example, even when kept in an environment at 60° C. or higher, and therefore, finds wide applications. In addition, the thermoplastic polymer composition of the invention is capable of adhering to at least one material selected from ceramics, metals, and synthetic resins even by the heat treatment at 190° C. or lower. Therefore, the present invention has made it possible to provide a molded product comprising the thermoplastic polymer composition adhered to these materials. Further, the treatment of these materials with a primer before the thermoplastic polymer composition is adhered to these materials is not needed.

Therefore, the molded product can be produced by an existing machine equipped with no additional heater, because the thermoplastic polymer composition discharged from an injection molding machine or an extruder is still sufficiently adhesive even after the surface thereof is cooled to 190° C. or lower. Further, the members made of various kinds of synthetic resins are not molten or deformed at 190° C. or lower, the damage of the members made of synthetic resins around the adhering portion by heating is avoided.

MODE FOR CARRYING OUT THE INVENTION

Thermoplastic Polymer Composition

The thermoplastic polymer composition of the invention comprises 100 parts by mass of a thermoplastic elastomer (A), 1 to 100 parts by mass of a polyvinyl acetal resin (B), and 5 to 100 parts by mass of a polar group-containing polypropylene resin (C). The thermoplastic elastomer (A) is a block copolymer which comprises a polymer block comprising aromatic vinyl compound units and a polymer block comprising isoprene units, butadiene units, or isoprene/butadiene units or a hydrogenated product of the block copolymer (hereinafter collectively referred to as "thermoplastic elastomer (A)"). Each of the isoprene units, butadiene units, and isoprene/butadiene units contains 1,2-bonding and 3,4-bonding in an amount of 40 mol % or more in total. The thermoplastic polymer composition may further comprise a softener (D). In view of further improving the moldability, the thermoplastic polymer composition may further comprise a tackifier resin (E).

The above components (A) to (E) are described below in this order.

Thermoplastic Elastomer (A)

The thermoplastic elastomer (A) is a component for providing the thermoplastic polymer composition with flexibility, good mechanical properties, and good moldability and also act as a matrix of the composition. As described above, by controlling the total content of 1,2-bonding and 3,4-bonding in the polymer block comprising isoprene units, butadiene units, or isoprene/butadiene units to 40 mol % or more, the compatibility particularly with the polar group-containing polypropylene resin (C) is enhanced. The high adhesion of the resultant thermoplastic polymer composition in an environment at 60° C. or higher, furthermore at 80° C. or higher is attributable to this enhanced compatibility.

Polymer Block Comprising Aromatic Vinyl Compound Units

Examples of the aromatic vinyl compound which constitutes the polymer block comprising aromatic vinyl compound units include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene. The polymer block may be constituted of units which are derived from a single kind or a combination of two or more of the above aromatic vinyl compounds. Of the above aromatic vinyl compounds, preferred are styrene, α-methylstyrene, and 4-methylstyrene.

In the present invention, the polymer block preferably comprises 80% by mass or more of the aromatic vinyl compound units, more preferably 90% by mass or more of the aromatic vinyl compound units, and still more preferably 95% by mass or more of the aromatic vinyl compound units, each based on the initial charge of the raw materials. The polymer block may be constituted of only the aromatic vinyl compound units or may be constituted of the aromatic vinyl compound units and units derived from other copolymerizable monomer if the effect of the invention is not adversely affected.

Examples of such copolymerizable monomer include 1-butene, pentene, hexene, butadiene, isoprene, and methyl vinyl ether. The content of the unit of copolymerizable monomer, if used, is preferably 20% by mass or less, more preferably 10% by mass or less, and still more preferably 5% by mass or less, each based on the total of the aromatic vinyl compound units and the units of copolymerizable monomer.

Polymer Block Comprising Isoprene Units, Butadiene Units, or Isoprene/Butadiene Units Examples of the compounds for constituting the polymer block comprising isoprene units, butadiene units, or isoprene/butadiene units include isoprene, butadiene, and 2,3-dimethyl-1,3-butadiene, with isoprene and butadiene being preferred.

In view of the adhesiveness at 190° C. or lower and the heat resistance (adhesion in an environment at 60° C. or higher), preferred is a polymer block comprising isoprene units or isoprene/butadiene units.

In the present invention, the term "isoprene unit" means the constitutional unit derived from isoprene, the term "butadiene unit" means the constitutional unit derived from a butadiene compound, such as butadiene and 2,3-dimethyl-1,3-butadiene, and the term "isoprene/butadiene unit" means the constitutional unit derived from both of isoprene and the butadiene compound, such as butadiene and 2,3-dimethyl-1,3-butadiene.

In view of the heat resistance, 40 mol % or more of the bondings between the compounds which constitute the polymer block comprising isoprene units, butadiene units, or isoprene/butadiene units, i.e., the bondings between isoprene molecules, between butadiene molecules, and between isoprene molecule and butadiene molecule, is necessary to be 1,2-bonding and 3,4-bonding, as described above. From the same point of view, the total content of 1,2-bonding and 3,4-bonding is preferably 45 to 90 mol %, more preferably 50 to 85 mol %, and still more preferably 50 to 80 mol %. The bonding way other than 1,2-bonding and 3,4-bonding is 1,4-bonding.

The content of 1,2-bonding and 3,4-bonding is calculated from the results of $^1$H-NMR measurement, specifically calculated from the ratio of the integrated area of peak at 4.2 to 5.0 ppm attributable to the 1,2-bonded unit and 3,4-bonded unit to the integrated area of peak at 5.0 to 5.45 ppm attributable to the 1,4-bonded unit.

The content of the isoprene units, butadiene units, or isoprene/butadiene units in the "polymer block comprising isoprene units, butadiene units, or isoprene/butadiene units" referred to herein is preferably 80% by mass or more, more preferably 90% by mass or more, and still more preferably 95% by mass or more, each being based on the initial charge of the raw materials. The polymer block may be constituted of only the isoprene units, butadiene units, or isoprene/butadiene units or may be constituted of these units together with units of an additional copolymerizable monomer, if the effect of the invention is not greatly impaired.

Examples of the additional copolymerizable monomer include styrene monomers, such as styrene, α-methylstyrene, and 4-methylstyrene. The content of the units of the additional copolymerizable monomer, if any, is preferably 20% by mass or less, more preferably 10% by mass or less, and still more preferably 5% by mass or less, each being based on the total constitutional units.

The polymer block comprising aromatic vinyl compound units and the polymer block comprising isoprene units, butadiene units, or isoprene/butadiene units may be bonded by any manner, for example, bonded linearly, in branches, radially, or in combination of two or more thereof, and preferably bonded linearly.

When expressing the polymer block comprising aromatic vinyl compound units as "a" and the polymer block comprising isoprene units, butadiene units, or isoprene/butadiene units as "b," examples of the polymer blocks which are bonded linearly include a diblock copolymer represented by a-b, a triblock copolymer represented by a-b-a or b-a-b, a tetrablock copolymer represented by a-b-a-b, a pentablock copolymer represented by a-b-a-b-a or b-a-b-a-b, a copolymer represented by $(a-b)_nX$ wherein X is a coupling residue and n is an integer of 2 or more, and any combinations thereof, with the triblock copolymer being preferred and the triblock copolymer represented by a-b-a being more preferred.

The polymer block comprising isoprene units, butadiene units, or isoprene/butadiene units is preferably hydrogenated partly or completely, because heat resistance and weatherability are improved. The degree of hydrogenation of the polymer block comprising isoprene units, butadiene units, or isoprene/butadiene units is preferably 80% or more, more preferably 90% or more, when determined by the iodine values of the block copolymer before and after hydrogenation reaction.

The content of the polymer block comprising aromatic vinyl compound units in the thermoplastic elastomer (A) is preferably 5 to 75% by mass, more preferably 5 to 60% by mass, and still more preferably 10 to 40% by mass, each based on the total amount of the thermoplastic elastomer (A), because flexibility and mechanical properties are good.

The weight average molecular weight of the thermoplastic elastomer (A) is preferably 30,000 to 500,000, more preferably 50,000 to 400,000, because mechanical properties and moldability are good. The weight average molecular weight is determined by gel permeation chromatography (GPC) calibrated with polystyrene.

The thermoplastic elastomer (A) may be used singly or in combination of two or more.

As described above, the thermoplastic polymer composition of the invention comprises the specific thermoplastic elastomer (A) mentioned above. In addition, the thermoplastic polymer composition may contain a block copolymer which comprises a polymer block comprising aromatic vinyl compound units and a polymer block comprising conjugated diene compound units wherein the content of 1,4-bonding exceeds 60 mol % or a hydrogenated product of the block copolymer. In view of preventing the effects of the invention from being greatly impaired, the content of such block copolymer and its hydrogenated product is preferably 100 parts by mass or less, more preferably 40 parts by mass or less, more preferably 25 parts by mass or less, more preferably 10 parts by mass or less, still more preferably 5 parts by mass or less, and most preferably substantially zero, each based on 100 parts by mass of the thermoplastic elastomer (A). If the content is 100 parts by mass or less, more preferably 40 parts by mass or less, each based on 100 parts by mass of the thermoplastic elastomer (A), mechanical properties, such as tensile strength at break and tensile elongation at break, are good and the adhesion strength of the molded product wherein the thermoplastic polymer composition is adhered to ceramics, metals, or synthetic resins is high in an environment at 60° C. or higher, thereby making the thermoplastic polymer composition difficult to peel. This would be attributable to the compatibility with the component (C) as will be described below.

The details of the above block copolymer and its hydrogenated product are the same as those mentioned above except that the content of 1,4-bonding in the polymer block comprising conjugated diene compound units exceeds 60 mol %.

Examples of the conjugated diene compound for forming the conjugated diene compound units of the polymer block wherein the content of 1,4-bonding exceeds 60 mol % include isoprene, butadiene, 2,3-dimethyl-1,3-butadiene, 1,3-pentadiene, and 1,3-hexadiene.

The polymer block comprising conjugated diene compound units wherein the content of 1,4-bonding exceeds 60 mol % may be constituted by units which are derived from the above conjugated diene compound singly or in combination of two or more, and particularly preferably butadiene or isoprene singly or in combination of butadiene and isoprene.

The content of 1,4-bonding is calculated from the results of $^1$H-NMR measurement, as described above.

Production of Thermoplastic Elastomer (A)

The production method of the thermoplastic elastomer (A) is not particularly limited, and it may be produced, for example, by anionic polymerization, such as:

(i) a method wherein first the aromatic vinyl compound, then the conjugated diene compound, and finally the aromatic vinyl compound are sequentially polymerized in the presence of an alkyllithium compound initiator;

(ii) a method wherein the aromatic vinyl compound and then the conjugated diene compound are sequentially polymerized in the presence of an alkyllithium compound initiator, and then a coupling agent is coupled; and (iii) a method wherein the conjugated diene compound and then the aromatic vinyl compound are sequentially polymerized in the presence of a dilithium compound initiator.

Examples of the alkyllithium compound for the methods (i) and (ii) include methyllithium, ethyllithium, n-butyllithium, sec-butyllithium, tert-butyllithium, and pentyllithium. Examples of the coupling agent for the method (ii) include dichloromethane, dibromomethane, dichloroethane, dibromoethane, and dibromobenzene. Example of the dilithium compound for the method (III) include naphthalene dilithium and dilithiohexylbenzene.

The amounts of use of the initiator, such as the alkyllithium compound and the dilithium compound, and the coupling agent depend upon the intended weight average molecular weight of the thermoplastic elastomer (A). Generally, the initiator, such as the alkyllithium compound and the dilithium compound, is used 0.01 to 0.2 parts by mass based on 100 parts by mass of the total of the aromatic vinyl compound and the conjugated diene compound used in the anionic polymerization. In the method (ii), the coupling agent is generally used 0.001 to 0.8 parts by mass based on 100 parts by mass of the total of the aromatic vinyl compound and the conjugated diene compound used in the anionic polymerization.

The anionic polymerization is conducted preferably in the presence of a solvent. The solvent is not particularly limited as long as it is inert to the initiator and does not adversely affect the polymerization, and examples thereof include a saturated aliphatic hydrocarbon, such as hexane, heptane, octane, and decane, and an aromatic hydrocarbon, such as toluene, benzene, and xylene. The polymerization is conducted preferably at 0 to 80° C. for 0.5 to 50 h in any of the above polymerization methods.

The content of 1,2-bonding and 3,4-bonding in the thermoplastic elastomer (A) can be increased and easily controlled by conducting the anionic polymerization in the presence of an organic Lewis base.

Examples of the organic Lewis base include esters, such as ethyl acetate; amines, such as triethylamine, N,N,N',N'-tetramethylethylenediamine (TMEDA), and N-methyl morpholine; nitrogen-containing heteroaromatic compounds, such as pyridine; amides, such as dimethylacetamide; ethers, such as dimethyl ether, diethyl ether, tetrahydrofuran (THF), and dioxane; glycol ethers, such as ethylene glycol dimethyl ether, and diethylene glycol dimethyl ether; sulfoxides, such as dimethyl sulfoxide; and ketones, such as acetone and methyl ethyl ketone. These organic Lewis base may be used alone or in combination of two or more.

In view of controlling the content of 1,2-bonding and 3,4-bonding in the thermoplastic elastomer (A) to 40 mol % or more, the amount of the organic Lewis base to be used is preferably 0.01 to 1000 times, more preferably 0.1 to 100 times, and still more preferably 0.1 to 50 times, each stoichiometrically based on the amount of lithium ion contained in the initiator. If the amount of the organic Lewis base is regulated within the above ranges, the content of 1,2-bonding and 3,4-bonding of the thermoplastic elastomer (A) can be controlled to any of the above ranges.

The non-hydrogenated thermoplastic elastomer (A) can be isolated after the polymerization by the method mentioned above by pouring the reaction product solution into a poor solvent to the block copolymer, such as methanol, thereby solidifying the block copolymer or by pouring the reaction product solution into hot water together with steam to azeotropically remove the solvent (steam stripping) and then drying.

The hydrogenated thermoplastic elastomer (A) is produced by the hydrogenation of the obtained non-hydrogenated thermoplastic elastomer (A). The hydrogenation reaction is conducted by allowing hydrogen to react with the thermoplastic elastomer (A) in the presence of a hydrogenation catalyst, using a solution of the non-hydrogenated thermoplastic styrene elastomer (A) in a solvent inert to the reaction and the hydrogenation catalyst or using the reaction product solution without isolating the non-hydrogenated thermoplastic styrene elastomer (A).

Examples of the hydrogenation catalyst include Raney nickel; a heterogeneous catalyst comprising a metal, such as Pt, Pd, Ru, Rh, and Ni, carried on a support, such as carbon, alumina and diatomaceous earth; and Ziegler catalyst composed of a combination of a transition metal compound with an alkylaluminum compound or an alkyllithium compound; and metallocene catalyst.

The hydrogenation reaction is generally conducted at a hydrogen pressure of 0.1 to 20 MPa and a reaction temperature of 20 to 250° C. for a reaction time of 0.1 to 100 h. The hydrogenated thermoplastic styrene elastomer (A) is isolated after the hydrogenation in the manner mentioned above by pouring the product solution of hydrogenation into a poor solvent, such as methanol, thereby solidifying the hydrogenated thermoplastic styrene elastomer (A) or by pouring the product solution of hydrogenation into hot water together with steam to azeotropically remove the solvent (steam stripping) and then drying.

Polyvinyl Acetal Resin (B)

The polyvinyl acetal resin (B) enhances the adhesion of the thermoplastic polymer composition and is generally dispersed in the thermoplastic polymer composition in island forms. By the use of the polyvinyl acetal resin (B), the thermoplastic polymer composition is firmly adhered to an adherend, such as ceramics, metals, and synthetic resins, without treating its surface with a primer.

The polyvinyl acetal resin (B) generally comprises the repeating units represented by formula (I):

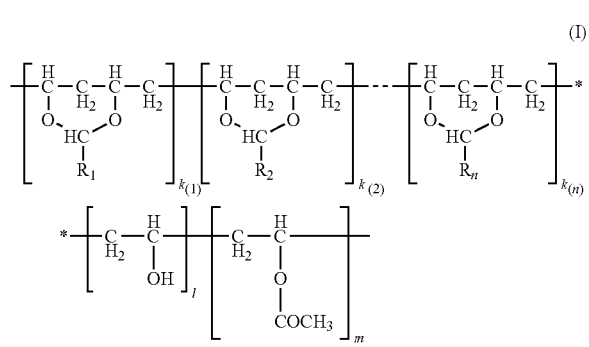

In formula (I), n represents the number of types of aldehydes used in acetalization; each of $R_1$, $R_2$, ..., and $R_n$ represents an alkyl group or a hydrogen atom in each aldehyde used in acetalization; each of $k_{(1)}$, $k_{(2)}$, ..., and $k_{(n)}$ represents the proportion (molar ratio) of the constitutional unit in [ ]; l represents the proportion (molar ratio) of vinyl alcohol units; and m represents the proportion (molar ratio) of vinyl acetate units, provided that $k_{(1)}$+$k_{(2)}$+ ... +$k_{(n)}$+l+m=1 and any of $k_{(1)}$, $k_{(2)}$, ..., $k_{(n)}$, l, and m can be zero.

The repeating units are not necessarily distributed in the above sequence and may be distributed in a random fashion, a block fashion, or a tapered fashion.

Production of Polyvinyl Acetal Resin (B)

The polyvinyl acetal resin (B) is produced, for example, by the reaction of a polyvinyl alcohol and an aldehyde.

The average degree of polymerization of the polyvinyl alcohol for the production of the polyvinyl acetal resin (B) is preferably 100 to 4,000, more preferably 100 to 3,000, still more preferably 100 to 2,000, and further preferably 250 to 2,000. If being 100 or more, the polyvinyl acetal resin (B) is easily produced and handled. If being 4,000 or less, the melt viscosity of the resultant polyvinyl acetal resin (B) is not excessively high during the melt kneading, to facilitate the production of the thermoplastic polymer composition of the invention.

The average degree of polymerization of polyvinyl alcohol referred to herein is determined according to the method of JIS K 6726, specifically, determined from the intrinsic viscosity measured in water at 30° C. after resaponification of polyvinyl alcohol and purification.

The production method of the polyvinyl alcohol is not particularly limited and the polyvinyl alcohol which is produced, for example, by saponifying polyvinyl acetate with alkali, acid, or ammonia is usable. Commercially available products, for example, "Kuraray Poval" series available from Kuraray Co., Ltd., are also usable. The polyvinyl alcohol may be saponified completely or partly.

The degree of saponification is preferably 80% by mole or more, more preferably 90% by mole or more, and still more preferably 95% by mole or more.

Also usable as the polyvinyl alcohol includes a copolymer of vinyl alcohol and a monomer copolymerizable with vinyl alcohol, for example, an ethylene-vinyl alcohol copolymer and a partly saponified ethylene-vinyl alcohol copolymer. A modified polyvinyl alcohol which is partly introduced with a carboxylic acid is also usable. The above polyvinyl alcohol may be used singly or in combination of two or more.

The aldehyde used for the production of the polyvinyl acetal resin (B) is not particularly limited, and examples thereof include formaldehyde (inclusive of paraformaldehyde), acetaldehyde (inclusive of paraacetaldehyde), propionaldehyde, n-butylaldehyde, isobutylaldehyde, pentanal, hexanal, heptanal, n-octanal, 2-ethylhexyl aldehyde, cyclohexanecarbaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. These aldehydes may be used singly or in combination of two or more. Of the above aldehyde, butylaldehyde is preferred and n-butylaldehyde is more preferred in view of easiness of production.

The polyvinyl acetal resin (B) produced by the acetalization using n-butylaldehyde is particularly referred to as "polyvinyl butyral (PVB)."

In the polyvinyl acetal resin (B), the content of butyral units in acetal units (see the formula below) is preferably 0.8 or more, more preferably 0.9 or more, still more preferably 0.95 or more, and particularly preferably approximate to 1.

For example, in the polyvinyl acetal resin (B) represented by formula (I) wherein only $R_1$ represents n-$C_3H_7$, the content is represented preferably by the formula: $0.8 \leq k_{(1)}/(k_{(1)}+k_{(2)}+ \ldots +k_{(n)})$.

The degree of acetalization of the polyvinyl acetal resin (B) is preferably 55 to 88% by mole. Polyvinyl acetal resin (B) having a degree of acetalization of 55% by mole or more is produced at lower costs, easily available, and melt-processed easily. Polyvinyl acetal resin (B) having a degree of acetalization of 88% by mole or less is economical, because which is produced very easily without requiring a long-term acetalization.

The degree of acetalization of the polyvinyl acetal resin (B) is more preferably 60 to 88% by mole, still more preferably 70 to 88% by mole, and particularly preferably 75 to 85% by mole. In view of adhesion to ceramics, metals and synthetic resins, it is advantageous for the polyvinyl acetal resin (B) to have a low degree of acetalization, because the content of hydroxyl groups increases with decreasing degree of acetalization. However, within the above ranges, the affinity and compatibility with the thermoplastic elastomer (A) is good, the mechanical properties of the resultant thermoplastic polymer composition are excellent, and the adhesion strength to ceramics, metals, and synthetic resins is high.

The degree of acetalization (% by mole) of the polyvinyl acetal resin (B) is defined by the following formula:

Degree of acetalization (% by mole)=$\{k_{(1)}+k_{(2)}+ \ldots +k_{(n)}\} \times 2 / \{\{k_{(1)}+k_{(2)}+ \ldots +k_{(n)}\} \times 2+l+m\} \times 100$ wherein n, $k_{(1)}$, $k_{(2)}$, ... $k_{(n)}$, l, and m are as defined above.

The degree of acetalization of the polyvinyl acetal resin (B) is determined in line with the method of JIS K 6728 (1977). Specifically, the ratio ($k_o$) of the vinyl acetal unit by mass is calculated from the formula: $k_o=1-l_o-m_o$, wherein $l_0$ is the ratio of the vinyl alcohol unit by mass and $m_0$ is the ratio of the vinyl acetate unit by mass, each determined by titration. Then, the molar ratio 1 of the vinyl alcohol unit is calculated from the formula: ; $l=(l_0/44.1)/(l_0/44.1+m_0/86.1+2k_0/Mw(acetal))$, and the molar ratio m of the vinyl acetate unit from the formula: $m=(m_0/86.1)/(l_0/44.1+m_0/86.1+k_0/Mw(acetal))$. Then, the molar ratio of the vinyl acetal unit $(k=k_{(1)}+k_{(2)}+\ldots+k_{(n)})$ is calculated from the formula: $k=1-l-m$. In the above formulae, Mw(acetal) is the molecular weight of a single vinyl acetal unit. For example, Mw(acetal) is Mw(butyral)=142.2 for polyvinyl butyral. Finally, the degree of acetalization (% by mole) is calculated from the formula: $\{k_{(1)}+k_{(2)}+\ldots+k_{(n)}\}\times2/\{\{k_{(1)}+k_{(2)}+\ldots+k_{(n)}\}\times2+l++m\}\times100$.

The degree of acetalization of the polyvinyl acetal resin (B) can be also calculated from the results of $^1$H-NMR or $^{13}$C-NMR using a solution of the polyvinyl acetal resin (B) in an appropriate deuterated solvent, such as deuterated dimethyl sulfoxide.

In the polyvinyl acetal resin (B), the content of the vinyl alcohol unit is preferably 12 to 45% by mole ($0.12\le l\le0.45$), more preferably 17 to 45% by mole ($0.17\le l\le0.45$) and the content of the vinyl acetate unit is preferably 0 to 5% by mole ($0\le m\le0.05$), more preferably 0 to 3% by mole ($0\le m\le0.03$).

The reaction between the polyvinyl alcohol and the aldehyde (acetalization) can be conducted by a known method, for example, an aqueous solvent method in which an aqueous solution of the polyvinyl alcohol and the aldehyde are subjected to acetalization in the presence of an acid catalyst to precipitate the particles of the polyvinyl acetal resin (B), or a solvent method in which a dispersion of the polyvinyl alcohol in an organic solvent is subjected to acetalization with the aldehyde in the presence of an acid catalyst and then a poor solvent to the polyvinyl acetal resin (B), such as water, is added to the resultant reaction mixture to precipitate the polyvinyl acetal resin (B).

The acid catalyst is not particularly limited and examples thereof include organic acids, such as acetic acid and p-toluenesulfonic acid; inorganic acids, such as nitric acid, sulfuric acid, and hydrochloric acid; gaseous materials, such as carbon dioxide, which exhibit acidity when dissolved in water; and solid acid catalysts, such as cation exchange resin and metal oxide.

The slurry obtained in the aqueous solvent method and the solvent method is generally acidic because of the acidic catalyst contained therein. The acidity is reduced by a method in which the pH value is adjusted to preferably 5 to 9, more preferably 6 to 9, and still more preferably 6 to 8 by repeated washing with water; a method in which the pH value is adjusted to preferably 5 to 9, more preferably 6 to 9, and still more preferably 6 to 8 by adding a neutralizing agent; or a method of adding an alkylene oxide to the slurry.

Examples of the compound for adjusting the pH value include alkali metal hydroxides, such as sodium hydroxide and potassium hydroxide; alkali metal acetate, such as sodium acetate; alkali metal carbonates, such as sodium carbonate and potassium carbonate; alkali metal hydrogencarbonates, such as sodium hydrogencarbonate; and ammonia or aqueous ammonia solution. Examples of the alkylene oxide include ethylene oxide, propylene oxide, and glycidyl ethers, such as ethylene glycol diglycidyl ether.

Next, the salt generated by neutralization, the residual non-reacted aldehyde, etc. are removed.

The method for removal is not particularly limited and generally conducted by repeating dehydration and washing with water. The water-containing polyvinyl acetal resin (B) after removing the residues is, if necessary, dried and then, if necessary, made into powder, granule, or pellet.

The polyvinyl acetal resin (B) to be used in the invention is preferably deaerated under reduced pressure to reduce the content of the residual aldehyde and water when made into powder, granule, or pellet.

The thermoplastic polymer composition of the invention contains 1 to 100 parts by mass of the polyvinyl acetal resin (B) per 100 parts by mass of the thermoplastic elastomer (A). If the content of the polyvinyl acetal resin (B) is less than 1 part by mass, sufficient adhesion to ceramics, metals, and synthetic resins is difficult to obtain. The lower content of the polyvinyl acetal resin (B) is more preferably 5 parts by mass or more, still more preferably 10 parts by mass or more, and particularly preferably 15 parts by mass or more. If the content of the polyvinyl acetal resin (B) exceeds 100 parts by mass, the thermoplastic polymer composition becomes hard to make it difficult to exhibit flexibility and mechanical properties, although adhesion is sufficient. The upper content is more preferably 70 parts by mass or less, still more preferably 50 parts by mass or less, and particularly preferably 45 parts by mass or less. In another aspect of the invention, the content of the polyvinyl acetal resin (B) is preferably 1 to 70 parts by mass, more preferably 5 to 70 parts by mass, still more preferably 10 to 70 parts by mass, further preferably 10 to 50 parts by mass, and particularly preferably 15 to 45 parts by mass, each based on 100 parts by mass of the thermoplastic elastomer (A).

Polar Group-Containing Polypropylene Resin (C)

By including the polar group-containing polypropylene resin (C) in addition to the thermoplastic elastomer (A) and the polyvinyl acetal resin (B), the thermoplastic polymer composition of the invention has good moldability and also adheres strongly to ceramics, metals, and synthetic resins even at 190° C. or lower and maintains high adhesion to ceramics, metals, and synthetic resins even when the molded product is exposed to an environment at 60° C. or higher.

Examples of the polar group of the polar group-containing polypropylene resin (C) include (meth)acryloyloxy group, hydroxyl group, amide group, halogen atom, such as chlorine atom, carboxyl group, and acid anhydride group. The polar group-containing polypropylene resin (C) is produced, for example, by a known random polymerization, block polymerization, or graft polymerization of propylene (together with α-olefin, if necessary) and a copolymerizable polar group-containing monomer, although not particularly limited thereto. In addition, the polar group-containing polypropylene resin (C) may be produced by oxidizing or chlorinating a polypropylene resin in a known method.

Examples of the α-olefin include ethylene, 1-butene, 1-pentene, 1-hexene, 1-octene, 4-methyl-1-pentene, and cyclohexene. The content of the units derived from the α-olefin except for propylene is preferably 0 to 45 mol %, more preferably 0 to 35 mol %, and still more preferably 0 to 25 mol %, each based on the total constitutional units in the polar group-containing polypropylene resin (C).

Examples of the copolymerizable polar group-containing monomer include vinyl acetate, vinyl chloride, ethylene oxide, propylene oxide, acrylamide, unsaturated carboxylic acid, and ester or anhydride of unsaturated carboxylic acid, with the unsaturated carboxylic acid and its ester and anhydride being preferred. Examples of the unsaturated carboxylic acid and its ester and anhydride include (meth) acrylic acid, (meth)acrylic ester, maleic acid, maleic anhydride, fumaric acid, itaconic acid, itaconic anhydride, himic acid, and himic anhydride, with maleic anhydride being more preferred. These copolymerizable polar group-containing monomers may be used alone or in combination of two or more.

In view of the compatibility with the polyvinyl acetal resin (B), the polar group-containing polypropylene resin (C) is preferably a polypropylene having a carboxyl group as the polar group, i.e., a carboxylic acid-modified polypropylene resin, and more preferably a maleic anhydride-modified polypropylene resin.

Examples of the (meth)acrylic ester as the copolymerizable polar group-containing monomer include alkyl acrylates, such as methyl acrylate, ethyl acrylate, n-propyl acrylate, isopropyl acrylate, n-butyl acrylate, isobutyl acrylate, n-hexyl acrylate, isohexyl acrylate, n-octyl acrylate, isooctyl acrylate, and 2-ethylhexyl acrylate; and alkyl methacrylates, such as methyl methacrylate, ethyl methacrylate, n-propyl methacrylate, isopropyl methacrylate, n-butyl methacrylate, isobutyl methacrylate, n-hexyl methacrylate, isohexyl methacrylate, n-octyl methacrylate, isooctyl methacrylate, and 2-ethylhexyl methacrylate. These (meth)acrylic esters may be used alone or in combination of two or more.

The polymerization fashion of the polar group-containing polypropylene resin (C) is not particularly limited, and a random polymer, a block copolymer, and a graft copolymer are usable, with the random copolymer and graft copolymer being preferred and the graft copolymer being more preferred.

The polar group of the polar group-containing polypropylene resin (C) may be modified after the polymerization. For example, the (meth)acrylic acid unit and carboxylic group may be neutralized by metal ion to convert the resin to an ionomer or may be esterified by methanol or ethanol. In addition, the vinyl acetate unit may be hydrolyzed.

The melt flow rate (MFR) of the polar group-containing polypropylene resin (C) is preferably 0.1 to 100 g/10 min, more preferably 0.1 to 70 g/10 min, still more preferably 0.1 to 50 g/10 min, further preferably 1 to 30 g/10 min, still further preferably 1 to 20 g/10 min, and particularly preferably 1 to 15 g/10 min, when measured at 230° C. under a load of 2.16 kg (21.18 N). If being 0.1 g/10 min or more, sufficient adhesion strength is obtained even at 190° C. or lower. If being 100 g/10 min or less, the polar group-containing polypropylene resin (C) is easily available and enhances the mechanical properties of the resultant composition.

In view of heat resistance, the melting point of the polar group-containing polypropylene resin (C) is preferably 100° C. or higher, more preferably 110 to 170° C., and still more preferably 120 to 140° C.

The content of the polar group-containing constitutional unit in the polar group-containing polypropylene resin (C) is preferably 0.01 to 10% by mass, more preferably 0.01 to 5% by mass, still more preferably 0.1 to 3% by mass, and particularly preferably 0.1 to 2% by mass, each based on the total constitutional units of the polar group-containing polypropylene resin (C). Within the above ranges, the affinity and compatibility of the polar group-containing polypropylene resin (C) with the thermoplastic elastomer (A) and also with the polyvinyl acetal resin (B) are good, thereby making the mechanical properties of the thermoplastic polymer composition good, the adhesion to ceramics, metals and synthetic resins high, and the adhesion strength at 190° C. or lower high. To optimize the content of the polar group-containing constitutional unit, a polypropylene resin having the polar group-containing constitutional unit in high concentration may be diluted with a polypropylene resin having no polar group-containing constitutional unit.

The thermoplastic polymer composition of the invention contains 5 to 100 parts by mass of the polar group-containing polypropylene resin (C) per 100 parts by mass of the thermoplastic elastomer (A). If less than 5 parts by mass, it is difficult to adhere the thermoplastic polymer composition to ceramics, metals, or synthetic resins at 190° C. or lower, and the adhesion strength becomes insufficient for practical use to make the thermoplastic polymer composition to easily peel off ceramics, metals, or synthetic resins when the molded product is exposed to an environment at 60° C. or higher. If exceeding 100 parts by mass, the thermoplastic polymer composition becomes hard, thereby failing to have good flexibility and mechanical properties, although a sufficient adhesion is obtained.

The content of the polar group-containing polypropylene resin (C) is more preferably 10 parts by mass or more, still more preferably 15 parts by mass or more, and particularly preferably 20 parts by mass or more, and more preferably 70 parts by mass or less, still more preferably 60 parts by mass or less, and particularly preferably 30 parts by mass or less, each based on 100 parts by mass of the thermoplastic elastomer (A).

In another aspect, the content of the polar group-containing polypropylene resin (C) is preferably 5 to 70 parts by mass, more preferably 10 to 70 parts by mass, more preferably 10 to 60 parts by mass, more preferably 10 to 30 parts by mass, and particularly preferably 20 to 30 parts by mass, each base on 100 parts by mass of the thermoplastic elastomer (A).

Softener (D)

Softeners generally used for rubbers and plastics are usable as the softener (D) to be optionally used in the thermoplastic polymer composition of the invention.

Examples thereof include paraffin-type, naphthene-type, or aromatic-type process oils; phthalic acid derivatives, such as dioctyl phthalate and dibutyl phthalate; white oils; mineral oils; ethylene-α-olefin oligomers; paraffin waxes; liquid paraffins; polybutene; low molecular weight polybutadiene; and low molecular weight polyisoprene, with process oils being preferred and paraffin-type process oils being more preferred.

Also usable are known softeners which are generally used in combination with polyvinyl acetal resins, for example, organic acid ester-type plasticizer, such as esters of monobasic organic acids or polybasic organic acids; and phosphoric acid-type plasticizer, such as organophosphoric esters and organophosphorous esters.

Examples of the esters of monobasic organic acids include glycol esters, such as triethylene glycol dicaproate, triethylene glycol di-2-ethyllactate, triethylene glycol di-n-octanoate, and triethylene glycol di-2-ethylhexanoate, which are obtained by the reaction between a glycol, such as triethylene glycol, tetraethylene glycol, and tripropylene glycol, and a monobasic organic acid, such as butyric acid, isobutyric acid, caproic acid, 2-ethylbutyric acid, heptylic acid, n-octylic acid 2-ethylhexylic acid, pelargonic acid (n-nonylic acid), and decylic acid.

Examples of the esters of polybasic organic acids include esters of a polybasic organic acid, such as adipic acid, sebacic acid, and azelaic acid, and an alcohol, for example, dibutyl sebacate, dioctyl azelate, and dibutylcarbitol adipate Examples of the organophosphoric esters include tributoxyethyl phosphate, isodecylphenyl phosphate, and triisopropyl phosphate.

The softeners (D) exemplified above may be used alone or in combination of two or more.

The thermoplastic polymer composition of the invention is not needed to contain the softener (D). However, in view of the flexibility, moldability, and adhesion, the thermoplastic polymer composition may contain the softener (D), if necessary, in an amount of preferably 0.1 to 300 parts by mass, more preferably 1 to 200 parts by mass, more preferably 10 to 200 parts by mass, still more preferably 50 to 200 parts by mass, and particularly preferably 50 to 150 parts by mass, each based on 100 parts by mass of the thermoplastic elastomer (A).

Tackifier Resin (E)

The thermoplastic polymer composition of the invention may optionally contain the tackifier resin (E) to further improve the moldability while maintaining a good adhesiveness.

Examples of the tackifier resin (E) include aliphatic unsaturated hydrocarbon resin, aliphatic saturated hydrocarbon resin, alicyclic unsaturated hydrocarbon resin, alicyclic saturated hydrocarbon resin, aromatic hydrocarbon resin, hydrogenated aromatic hydrocarbon resin, rosin ester resin, hydrogenated rosin ester resin, terpene phenol resin, hydrogenated terpene phenol resin, terpene resin, hydrogenated terpene resin, aromatic hydrocarbon-modified terpene resin, coumarone-indene resin, phenol resin, and xylene resin. The tackifier resin (E) may be used alone or in combination of two or more. Of the above, preferred are the aliphatic saturated hydrocarbon resin, the alicyclic saturated hydrocarbon resin, the hydrogenated aromatic hydrocarbon resin, and the hydrogenated terpene resin.

The softening point of the tackifier resin (E) is preferably 50 to 200° C., more preferably 65 to 180° C., and still more preferably 80 to 160° C. If being 50° C. or higher, the adhesion strength to be obtained under exposure to high temperature environment is prevented from decline. If being 200° C. or lower, the adhesion strength to be obtained at the heat treatment temperature is prevented from decline.

The softening point is measured according to ASTM28-67.

The thermoplastic polymer composition optionally contains the tackifier resin (E) in an amount of preferably 1 to 100 parts by mass, more preferably 5 to 70 parts by mass, still more preferably 5 to 50 parts by mass, and particularly preferably 10 to 45 parts by mass, each based on 100 parts by mass of the thermoplastic elastomer (A). If being 100 parts by. mass or less, the thermoplastic polymer composition does not become hard and easily exhibits the flexibility and mechanical properties.

Other Optional Components

The thermoplastic polymer composition may further contain another thermoplastic polymer, such as olefin-type polymer, styrene-type polymer, polyphenylene ether-type resin, and polyethylene glycol, as long as the addition thereof does not detract greatly from the effects of the invention. Examples of the olefin-type polymer include polyethylene, polypropylene, polybutene, and a block copolymer or a random copolymer of propylene with α-olefin, such as ethylene and 1-butene.

The content of another thermoplastic polymer, if contained, is preferably 100 parts by mass or less, more preferably 50 parts by mass or less, still more preferably 20 parts by mass or less, and further preferably 10 parts by mass or less, each based on 100 parts by mass of the thermoplastic elastomer (A).

The thermoplastic polymer composition may contain inorganic filler, if necessary. The inorganic filler is effective for improving the properties of the thermoplastic polymer composition, such as heat resistance and weatherability, regulating hardness, and reducing production costs by its bulking nature. Examples of the inorganic filler include calcium carbonate, talc, magnesium hydroxide, aluminum hydroxide, mica, clay, natural silicic acid, synthetic silicic acid, titanium oxide, carbon black, barium sulfate, glass balloon, and glass fiber, although not limited thereto. These inorganic fillers may be used alone or in combination of two or more.

The inorganic filler may be used preferably in an amount not to reduce the flexibility of the thermoplastic polymer composition, and the content thereof is preferably 100 parts by mass or less, more preferably 70 parts by mass or less, still more preferably 30 parts by mass or less, and particularly preferably 10 parts by mass or less, each based on 100 parts by mass of the thermoplastic elastomer (A).

The thermoplastic polymer composition may further contain, if necessary, antioxidant, lubricant, light stabilizer, processing aid, colorant, such as pigment and dye, flame retardant, antistatic agent, delustering agent, silicone oil, anti-blocking agent, ultraviolet absorber, mold release agent, foaming agent, antibacterial agent, anti-mold agent, and perfume, as long as such additives do not detract greatly from the effects of the invention.

Examples of the antioxidant include hindered phenol-type antioxidant, phosphorus-type antioxidant, lactone-type antioxidant, and hydroxyl-type antioxidant, with the hindered phenol-type antioxidant being preferred. The antioxidant is used preferably in an amount not to discolor the thermoplastic polymer composition during melt kneading, and the content thereof is preferably 0.1 to 5 parts by mass based on 100 parts by mass of the thermoplastic elastomer (A).

The production method of the thermoplastic polymer composition is not particularly limited. Any production method is usable as long as the components mentioned above are uniformly mixed, and generally, a melt kneading method is used, in which the components are melt-kneaded in a melt-kneading machine, such as single-screw extruder, twin-screw extruder, kneader, batch mixer, roller, and Banbury mixer, preferably at 170 to 270° C., thereby obtaining the thermoplastic polymer composition.

The hardness of the thermoplastic polymer composition thus obtained is preferably 93 or less, more preferably 30 to 90, and still more preferably 40 to 85 when measured according to JIS-A method of JIS K 6253 (also referred to as "type A hardness"). If the type A hardness is excessively high, the flexibility, elasticity, and mechanical properties are difficult to easily obtain, and the resultant thermoplastic polymer composition fails to exhibit excellent adhesion to synthetic resins, ceramics, and metals, particularly resins containing inorganic filler, such as glass fibers.

The melt flow rate (MFR) of the thermoplastic polymer composition is preferably 1 to 20 g/10 min, more preferably 1 to 10 g/10 min, and still more preferably 2 to 10 g/min, when measured at 230° C. under a load of 2.16 kg (21.18 N) according to JIS K 7210. Within the above ranges, the moldability is good and the operation of adhering to synthetic resins, particularly synthetic resins containing inorganic filler (glass fibers, etc.), ceramics, and metals is facilitated.

Molded Product

The present invention further provides molded products obtained by using the thermoplastic polymer composition.

The thermoplastic polymer composition of the invention is excellent in moldability and is made into molded products with various shapes. The molded product may be sheet or film.

The thermoplastic polymer composition can be formed into molded products by various processing methods which are generally used for forming known thermoplastic polymer compositions, for example, by any of injection molding method, extrusion method, press molding method, blow molding method, calender method, and casting method. T-die method, calender method, inflation method, and belt method which are generally known are usable in film or sheet formation.

In a preferred embodiment of the invention, the molded product comprises the thermoplastic polymer composition which is adhered to at least one material selected from ceramics, metals, and synthetic resins, or the molded product comprises the thermoplastic polymer composition which is adhered between the same kind of material selected from ceramics, metals, and synthetic resins or between at least two kinds of materials selected from ceramics, metals, and synthetic resins, with a molded product comprising the thermoplastic polymer composition which is adhered to at least one material selected from ceramics (particularly glass) and metals (particularly aluminum) being particularly preferred. The adhesion strength of the thermoplastic polymer composition in the molded product is preferably 20 N/25 mm or more, because the peeling by human hands is generally difficult. If less than 20 N/25 mm, the adhesion strength is insufficient for practical use, because easily peeled with slight resistance. The adhesion strength is measured according to JIS K 6854-2 described below in the example portion.

The thermoplastic polymer composition of the invention is excellent in flexibility, mechanical properties, formability, and particularly heat resistance, and exhibits adhesion to ceramics, metals, and synthetic resins sufficient for practical use even when the molded product is exposed to an environment at 60° C. or higher. In addition, the thermoplastic polymer composition is adhered to ceramics, metals, and synthetic resins at 190° C. or lower without a priming treatment. Therefore, in the production of a molded product, the thermoplastic polymer composition is sufficiently adhered to at least one material selected from ceramics, metals, and synthetic resins even when the surface of the thermoplastic polymer composition ejected from an injection molding machine or an extruder is cooled to 190° C. or lower, thereby making it possible to use the existing machine without using an additional heater. Further, members made of various kinds of synthetic resins are not molten or deformed at 190° C. or lower, the damage of the members made of synthetic resins around the adhering portion by heating is avoided.

The ceramics for use in the molded product is a non-metallic inorganic material, such as metal oxides, metal carbides, and metal nitrides, for example, glass, cement, alumina, zirconia, zinc oxide ceramics, barium titanate, lead zirconate titanate, silicon carbide, silicon nitride, and ferrite.

The metal for use in the molded product includes, for example, iron, copper, aluminum, magnesium, nickel, chromium, zinc, and alloys of these metals. A material having a metallic surface formed by copper plating, nickel plating, chromium plating, tin plating, zinc plating, platinum plating, gold plating, or silver plating is also usable.

The synthetic resin for use in the molded product include, for example, polyamide resin, polyester resin, polycarbonate resin, polyphenylene sulfide resin, (meth)acrylonitrile-butadiene-styrene resin, (meth)acrylonitrile-styrene resin, (meth)acrylic ester-butadiene-styrene resin, (meth)acrylic ester-styrene resin, butadiene-styrene resin, epoxy resin, phenol resin, diallyl phthalate resin, polyimide resin, melamine resin, polyacetal resin, polysulfone resin, polyether sulfone resin, polyether imide resin, polyphenylene ether resin, polyarylate resin, polyether ether ketone resin, polystyrene resin, syndiotactic polystyrene resin, and polyolefin resin. These resins may be used alone or in combination of two or more.

The synthetic resin mentioned above may contain inorganic filler, such as calcium carbonate, talc, magnesium hydroxide, aluminum hydroxide, mica, clay, natural silicic acid, synthetic silicic acid, titanium oxide, carbon black, barium sulfate, glass fiber, and glass balloon. These inorganic fillers may be used alone or in combination of two or more. Of the above, glass fiber is preferred.

The inorganic filler is blended preferably in an amount not to deteriorate the moldability and mechanical strength of the resin blended with the inorganic filler, and the content thereof is preferably 0.1 to 100 parts by mass, more preferably 1 to 50 parts by mass, and still more preferably 3 to 40 parts by mass, each based on 100 parts by mass of the synthetic resin.

The production method of the molded product comprising the thermoplastic polymer composition adhered to ceramic or metal is not particularly limited and any method can be employed as long as the thermoplastic polymer composition is fuse-bonded to the ceramic or metal. For example, an injection insert method, an extrusion lamination method, a press molding method, and a melt casting method are usable.

In the production of the molded product by the injection insert method, an adherend with a given shape and a given dimension is placed in a mold and then the thermoplastic polymer composition is injected into the mold. In the production of the molded product by the extrusion lamination method, a molten thermoplastic polymer composition is extruded directly onto the surface or edge of an adherend with a given shape and a given dimension from a die with a given shape which is disposed on an extruder. In the production of the molded product by the press molding method, the thermoplastic polymer composition is made into a formed product by injection molding or extrusion and then the obtained formed product is heat-pressed to an adherend with a given shape and a given dimension by a press molding machine. The surface not adhered to the adherend may be covered with a layer of a non-polar resin, such as olefin resin and cyclic olefin resin, for protection or decoration.

The production method of the molded product comprising the thermoplastic polymer composition adhered to the synthetic resin mentioned above is not particularly limited. The molded product can be produced by co-extruding or co-injecting a molten composition and a molten resin, or by forming one of the composition or the resin into a molded product and then fuse-coating or solution-coating the other on the obtained molded product. In addition, a two-color forming method and an insert molding method are usable.

The thermoplastic polymer composition of the invention is widely applicable to the production of the molded product mentioned above. The shape, structure, and use of the molded product made from the thermoplastic polymer composition of the invention are not particularly limited, and the present invention includes any of structures as long as comprising the thermoplastic polymer composition of the invention which is adhered to ceramics, metals or synthetic resins.

Synthetic resins, synthetic resins blended with glass fiber, and light metals, such as aluminum alloy and magnesium alloy, have been used as the housing material of electronic or electric appliances, OA equipments, household appliances, and automotive parts. The molded product having the thermoplastic polymer composition of the invention adhered is applicable to such housing material. Specifically, the molded product is bonded to the housing of large-sized display, notebook computer, mobile phone, PHS, PDA (personal digital assistant, such as electric organizer), electronic dictionary, video camera, digital still camera, portable radio cassette player, and inverter to work as a shock absorber, a non-slip coating, a waterproof material or a decorative material.

The thermoplastic polymer composition is also useful in a wide application as a molded product or structural member to be adhered to glass, for example, a window molding or gasket for automobiles and buildings, a sealant for glass, and an anti-corrosion material. The thermoplastic polymer composition is further useful for adhesively joining glass with aluminum sash or metal openings of windows of automobiles and buildings or adhesively joining glass with metal frame of photovoltaic modules. The thermoplastic polymer composition is further useful as the separator of rechargeable batteries for use in personal digital assistants, such as notebook computer, mobile phone, and video camera, hybrid vehicle, and fuel cell vehicle.

The thermoplastic polymer composition of the invention is suitably used as an adhesive. As shown in the following examples, since the thermoplastic polymer composition exhibits good adhesiveness to any of ceramics, metals, and synthetic resins, it is useful as an adhesive for bonding not only the same material but also different materials. In addition, since the thermoplastic polymer composition is flexible, the adhesive can reduce the defect due to the difference in the coefficient of thermal expansion between different materials.

EXAMPLES

The present invention is described below in more detail with reference to the examples. However, it should be noted that the scope of the present invention is not limited thereto.

The components used in the following examples and comparative examples are described below.

Thermoplastic Elastomer (A1)

Into a dried pressure vessel purged with nitrogen, 64 L of cyclohexane solvent, 0.20 L of sec-butyllithium initiator (10% by mass solution in cyclohexane), and 0.3 L of tetrahydrofuran as the Lewis base (stoichiometrically 15 times the lithium atom in the initiator) were charged. After raising the temperature to 50° C., 2.3 L of styrene was added to allow the polymerization to proceed for 3 h. Then, the polymerization was allowed to proceed for 4 h after adding 23 L of isoprene and further for 3 h after adding 2.3 L of styrene. The resultant reaction liquid was poured into 80 L of methanol, and the precipitated solid matter was separated by filtration and dried at 50° C. for 20 h, to obtain a polystyrene-polyisoprene-polystyrene triblock copolymer.

Then, 10 kg of the obtained triblock copolymer was dissolved in 200 L of cyclohexane. After adding a palladium carbon hydrogenation catalyst (content of carried palladium: 5% by mass) in an amount of 5% by mass of the copolymer, the reaction was allowed to proceed under a hydrogen pressure of 2 MPa at 150° C. for 10 h. After allowing the reaction production mixture to cool and releasing the pressure, the palladium carbon was removed by filtration. The filtrate was condensed and vacuum-dried to obtain a hydrogenated product (A1) of the triblock copolymer. The obtained thermoplastic elastomer (A1) had a weight average molecular weight of 107,000, a styrene content of 21% by mass, a degree of hydrogenation of 85%, a molecular weight distribution of 1.04, and a total 1,2-bonding/3,4-bonding content of 60% by mole.

Thermoplastic Elastomer (A2)

Into a dried pressure vessel purged with nitrogen, 150 L of cyclohexane solvent, 0.22 L of sec-butyllithium initiator (10% by mass solution in cyclohexane), and 0.3 L of tetrahydrofuran as the Lewis base (stoichiometrically 14 times the lithium atom in the initiator) were charged. After raising the temperature to 50° C., 0.72 L of styrene was added to allow the polymerization to proceed for 3 h. Then, the polymerization was allowed to proceed for 4 h after adding a mixed solution of 12.6 L of isoprene and 14.0 L of butadiene and further for 3 h after adding 2.2 L of styrene. The resultant reaction liquid was poured into 80 L of methanol, and the precipitated solid matter was separated by filtration and dried at 50° C. for 20 h, to obtain a polystyrene-poly(isoprene/butadiene)-polystyrene triblock copolymer.

Then, 10 kg of the obtained triblock copolymer was dissolved in 200 L of cyclohexane. After adding a palladium carbon hydrogenation catalyst (content of carried palladium: 5% by mass) in an amount of 5% by mass of the copolymer, the reaction was allowed to proceed under a hydrogen pressure of 2 MPa at 150° C. for 10 h. After allowing the reaction production mixture to cool and releasing the pressure, the palladium carbon was removed by filtration. The filtrate was condensed and vacuum-dried to obtain a hydrogenated product (A2) of the triblock copolymer. The obtained thermoplastic elastomer (A2) had a weight average molecular weight of 165,000, a styrene content of 13% by mass, a degree of hydrogenation of 85%, a molecular weight distribution of 1.02, and a total 1,2-bonding/3,4-bonding content of 63% by mole.

Thermoplastic Elastomer (A3)

Into a dried pressure vessel purged with nitrogen, 120 L of cyclohexane solvent, 0.12 L of sec-butyllithium initiator (10% by mass solution in cyclohexane), and 0.3 L of tetrahydrofuran as the Lewis base (stoichiometrically 26 times the lithium atom in the initiator) were charged. After raising the temperature to 50° C., 3.6 L of styrene was added to allow the polymerization to proceed for 3 h. Then, the polymerization was allowed to proceed for 4 h after adding 20.0 L of isoprene and further for 3 h after adding 3.6 L of styrene. The resultant reaction liquid was poured into 80 L of methanol, and the precipitated solid matter was separated by filtration and dried at 50° C. for 20 h, to obtain a polystyrene-polyisoprene-polystyrene triblock copolymer.

Then, 10 kg of the obtained triblock copolymer was dissolved in 200 L of cyclohexane. After adding a palladium carbon hydrogenation catalyst (content of carried palladium: 5% by mass) in an amount of 5% by mass of the copolymer, the reaction was allowed to proceed under a hydrogen pressure of 2 MPa at 150° C. for 10 h. After allowing the reaction production mixture to cool and releasing the pressure, the palladium carbon was removed by filtration. The filtrate was condensed and vacuum-dried to obtain a hydrogenated product (A3) of the triblock copolymer. The obtained thermoplastic elastomer (A3) had a weight average molecular weight of 320,000, a styrene content of 33% by mass, a degree of hydrogenation of 90%, a molecular weight distribution of 1.07, and a total 1,2-bonding/3,4-bonding content of 54% by mole.

Thermoplastic Elastomer (A4)

Into a dried pressure vessel purged with nitrogen, 86 L of cyclohexane solvent, 0.22 L of sec-butyllithium initiator (10% by mass solution in cyclohexane), and 0.02 L of ethylene glycol dimethyl ether as the Lewis base (stoichiometrically 0.7 time the lithium atom in the initiator) were charged. After raising the temperature to 50° C., 2.3 L of styrene was added to allow the polymerization to proceed for 3 h. Then, the polymerization was allowed to proceed for 4 h after adding 25.5 L of butadiene and further for 3 h after adding 2.3 L of styrene. The resultant reaction liquid was poured into 80 L of methanol, and the precipitated solid matter was separated by filtration and dried at 50° C. for 20 h, to obtain a polystyrene-polybutadiene-polystyrene triblock copolymer.

Then, 10 kg of the obtained triblock copolymer was dissolved in 200 L of cyclohexane. After adding a palladium carbon hydrogenation catalyst (content of carried palladium: 5% by mass) in an amount of 5% by mass of the copolymer, the reaction was allowed to proceed under a hydrogen pressure of 2 MPa at 150° C. for 10 h. After allowing the reaction production mixture to cool and releasing the pressure, the palladium carbon was removed by filtration. The filtrate was condensed and vacuum-dried to obtain a hydrogenated product (A4) of the triblock copolymer. The obtained thermoplastic elastomer (A4) had a weight average molecular weight of 126,000, a styrene content of 21% by mass, a degree of hydrogenation of 95%, a molecular weight distribution of 1.11, and a total 1,2-bonding/3,4-bonding content of 78% by mole.
Thermoplastic Elastomer (A'5)

Into a dried pressure vessel purged with nitrogen, 80 L of cyclohexane solvent, and 0.17 L of sec-butyllithium initiator (10% by mass solution in cyclohexane) were charged. After raising the temperature to 50° C., 3.9 L of styrene was added to allow the polymerization to proceed for 3 h. Then, the polymerization was allowed to proceed for 4 h after adding a mixed solution of 12.1 L of isoprene and 10.9 L of butadiene and further for 3 h after adding 3.9 L of styrene. The resultant reaction liquid was poured into 80 L of methanol, and the precipitated solid matter was separated by filtration and dried at 50° C. for 20 h, to obtain a polystyrene-poly(isoprene/butadiene)-polystyrene triblock copolymer.

Then, 20 kg of the obtained triblock copolymer was dissolved in 200 L of cyclohexane. After adding a palladium carbon hydrogenation catalyst (content of carried palladium: 5% by mass) in an amount of 5% by mass of the copolymer, the reaction was allowed to proceed under a hydrogen pressure of 2 MPa at 150° C. for 10 h. After allowing the reaction production mixture to cool and releasing the pressure, the palladium carbon was removed by filtration. The filtrate was condensed and vacuum-dried to obtain a hydrogenated product (A'5) of the triblock copolymer. The obtained thermoplastic elastomer (A5) had a weight average molecular weight of 170,000, a styrene content of 32% by mass, a degree of hydrogenation of 97%, a molecular weight distribution of 1.04, and a total 1,2-bonding/3,4-bonding content of 5% by mole.
Polyvinyl Acetal Resin (B1)

Into an aqueous solution of a polyvinyl alcohol resin having an average degree of polymerization of 500 and a degree of saponification of 99% by mole, n-butylaldehyde and an acid catalyst (hydrochloric acid) were added. The acetalization was conducted under stirring. The precipitated resin was washed by a known method until the pH value reached 6. Then, the resin was suspended in an aqueous alkaline medium and post-treated under stirring. The resultant resin was washed until the pH value reached 7 and dried until the volatile component was reduced to 0.3%, to obtain a polyvinyl acetal resin (B1) having a degree of acetalization of 80% by mole.
Polar Group-Containing Polypropylene Resin (C1)

In a batch mixer, 42 g of polypropylene "Prime Polypro F327" (MFR: 7 g/10 min at 230° C. under a load of 2.16 kg (21.18 N); manufactured by Prime Polymer Co., Ltd.), 160 mg of maleic anhydride, and 42 mg of 2,5-dimethyl-2,5-di(t-butylperoxy)hexane were melt-kneaded at 180° C. and a screw rotation of 40 rpm. The concentration of maleic anhydride in the kneaded product was 0.3%.

The concentration of maleic anhydride was determined by the titration of the kneaded product with a methanol solution of potassium hydroxide (the same applies below).
Poly Polypropylene resin (C'2)

Polypropylene "Prime Polypro F327" (MFR: 7 g/10 min at 230° C. under a load of 2.16 kg (21.18 N); manufactured by Prime Polymer Co., Ltd.).
Polar Group-Containing Polyethylene Resin (C'3)

In a batch mixer, 42 g of polyethylene "NEO-ZEX 0434N" (MFR: 4 g/10 min at 190° C. under a load of 2.16 kg (21.18 N); manufactured by Prime Polymer Co., Ltd.), 160 mg of maleic anhydride, and 42 mg of 5-dimethyl-2,5-di(t-butylperoxy)hexane were melt-kneaded at 180° C. and a screw rotation of 40 rpm. The concentration of maleic anhydride in the kneaded product was 0.3%. Softener (D1)

Paraffin process oil "Diana Process PW-90" manufactured by Idemitsu Kosan Co., Ltd.
Tackifier Resin (E1)

Hydrogenated aromatic hydrocarbon resin "Regalite 1100" manufactured by Eastman Chemical Company. Softening point: 100° C.
Tackifier Resin (E2)

Hydrogenated aromatic hydrocarbon resin "Regalite 1125" manufactured by Eastman Chemical Company. Softening point: 123° C.
Tackifier Resin (E3)

Hydrogenated terpene resin "Clearon M115" manufactured by Yasuhara Chemical Co., Ltd. Softening point: 115° C.
Tackifier Resin (E4)

Hydrogenated terpene resin "Clearon P150" manufactured by Yasuhara Chemical Co., Ltd. Softening point: 152° C.

The production of ach test piece of examples and comparative examples and the measurement or evaluation of the properties were made in the following manners. The results are shown collectively in Tables 1 and 2.
Measurement of Melt Flow Rate (MFR)

Small pieces obtained by cutting the thermoplastic polymer composition sheet produced in each of examples and comparative examples were measured for MFR at 230° C. under a load of 2.16 kg (21.18 N) according to the method of JIS K 7210. MFR was used as an index of the moldability, and the moldability becomes excellent with increasing MFR.
Measurement of Hardness Several sheets of thermoplastic polymer composition obtained in each of examples and comparative examples were piled to a thickness of 6 mm and measured for type A hardness by using a type A durometer according to JIS K 6253.
Tensile Strength at Break and Tensile Elongation at Break A dumbbell test piece (No. 5) prepared from the thermoplastic polymer composition sheet obtained in each of examples and comparative examples was measured for the tensile strength at break and tensile elongation at break at 23° C. and a tensile speed of 500 mm/min according to JIS K 6251.

Preparation of Laminate with Glass Plate

Both surfaces of a glass plate of 75 mm length×25 mm width×1 mm thickness were washed with an aqueous solution of surfactant, methanol, acetone, and distilled water successively in this order and then dried. The glass plate thus treated, each of the thermoplastic polymer composition sheets produced in the following examples and comparative examples, and a polyethylene terephthalate (PET) sheet having a thickness of 50 μm were piled in this order and the resultant pile was placed at the center of a metal spacer having outer dimensions of 200 mm×200 mm, inner dimensions of 150 mm×150 mm, and a thickness of 2 mm.

The piled sheets together with the metal spacer were placed between two sheets of polytetrafluoroethylene, which was then put between two metal plates and compression-molded by using a press molding machine at a temperature shown in Table 1 or 2 under a load of 20 kgf/cm$^2$ (2 N/mm$^2$) for 3 min, thereby obtaining a laminate of PET/thermoplastic polymer composition/glass plate.

Preparation of Laminate with Aluminum Plate

Each laminate of PET/thermoplastic polymer composition/aluminum plate was prepared in the same manner as in the preparation of the laminate with glass plate except for washing both surfaces of an aluminum plate of 75 mm length×25 mm width×1 mm thickness with an aqueous solution of surfactant and distilled water successively in this order and then drying.

Measurement of Adhesion Strength

Each of the laminates of PET/thermoplastic polymer composition/glass plate and the laminates of PET/thermoplastic polymer composition/aluminum plate produced above was measured for the peeling strength between the thermoplastic polymer composition layer and the glass plate or between the thermoplastic polymer composition layer and the aluminum plate at a peel angle of 180°, a tensile speed of 50 mm/min, and 23° C. according to JIS K 6854-2.

In addition, each of the laminates which were prepared by the press molding at 180° C. or 240° C. under a load of 20 kgf/cm$^2$ (2 N/mm$^2$) for 3 min was measured for the peeling strength between the thermoplastic polymer composition layer and the glass plate or between the thermoplastic polymer composition layer and the aluminum plate at a peel angle of 180°, a tensile speed of 50 mm/min, and a temperature shown in Table 1 or 2, thereby evaluating the heat resistance by using the measured peeling strength as the index.

Examples 1 to 11 and Comparative Examples 1 TO 4

Production of Thermoplastic Polymer Composition Sheet

The raw materials in the proportions shown in Table 1 or 2 were melt-kneaded in a batch mixer at 230° C. and a screw rotation of 200 rpm. The kneaded product was compression-molded by using a press molding machine at 230° C. under a load of 100 kgf/cm$^2$ (9.8 N/mm$^2$) for 3 min, thereby obtaining a thermoplastic polymer composition sheet having a thickness of 1 mm.

The obtained thermoplastic polymer composition sheet was measured and evaluated for its properties by the methods mentioned above. The results are shown in Tables 1 and 2.

TABLE 1

| Compositions | Examples | | | | | | | | | | |
|---|---|---|---|---|---|---|---|---|---|---|---|
| (parts by mass) | 1 | 2 | 3 | 4 | 5 | 6 | 7 | 8 | 9 | 10 | 11 |
| (A1) | 100 | 100 | | | | 100 | 100 | 100 | 100 | 100 | 100 |
| (A2) | | | 100 | | | | | | | | |
| (A3) | | | | 100 | | | | | | | |
| (A4) | | | | | 100 | | | | | | |
| (A'5) | | | | | | | | | | | |
| (B1) | 19 | 19 | 19 | 37.5 | 19 | 23 | 21 | 23 | 27 | 23 | 23 |
| (C1) | 25 | 15 | 25 | 50 | 25 | 31 | 31 | 31 | 31 | 31 | 31 |
| (C'2) | | | | | | | | | | | |
| (C'3) | | | | | | | | | | | |
| (D1) | | | | 100 | | | | | | | |
| (E1) | | | | | | | 25 | | | | |
| (E2) | | | | | | | | 11 | 25 | 43 | |
| (E3) | | | | | | | | | | 25 | |
| (E4) | | | | | | | | | | | 25 |
| Melt flow rate MFR (g/10 min) | 4.0 | 4.5 | 3.7 | 3.0 | 4.4 | 16 | 14 | 14 | 28 | 15 | 11 |
| Type A hardness | 76 | 76 | 72 | 60 | 77 | 78 | 77 | 80 | 87 | 79 | 80 |
| Tensile strength at break (MPa) | 15 | 14 | 15 | 8 | 14 | 18 | 17 | 20 | 19 | 19 | 22 |
| Tensile elongation at break (%) | 680 | 710 | 880 | 800 | 670 | 740 | 670 | 700 | 680 | 750 | 710 |
| (A1) | 100 | 100 | | | | 100 | 100 | 100 | 100 | 100 | 100 |
| (A2) | | | 100 | | | | | | | | |
| (A3) | | | | 100 | | | | | | | |
| (A4) | | | | | 100 | | | | | | |
| (A'5) | | | | | | | | | | | |
| (B1) | 19 | 19 | 19 | 37.5 | 19 | 23 | 21 | 23 | 27 | 23 | 23 |
| (C1) | 25 | 15 | 25 | 50 | 25 | 31 | 31 | 31 | 31 | 31 | 31 |
| (C'2) | | | | | | | | | | | |
| (C'3) | | | | | | | | | | | |
| (D1) | | | | 100 | | | | | | | |
| (E1) | | | | | | | 25 | | | | |

TABLE 1-continued

| Compositions | Examples | | | | | | | | | | |
|---|---|---|---|---|---|---|---|---|---|---|---|
| (parts by mass) | 1 | 2 | 3 | 4 | 5 | 6 | 7 | 8 | 9 | 10 | 11 |
| (E2) | | | | | | | 11 | 25 | 43 | | |
| (E3) | | | | | | | | | | 25 | |
| (E4) | | | | | | | | | | | 25 |

Adhesion Strength (glass plate) (N/25 mm)

| Press molding temperature | Measuring temperature | 1 | 2 | 3 | 4 | 5 | 6 | 7 | 8 | 9 | 10 | 11 |
|---|---|---|---|---|---|---|---|---|---|---|---|---|
| 240° C. | 23° C. | 142 | 120 | 119 | 70 | 130 | 144 | 136 | 152 | 174 | 136 | 151 |
| 180° C. | 23° C. | 180 | 155 | 114 | 75 | 150 | 150 | 145 | 160 | 180 | 135 | 165 |
| 160° C. | 23° C. | 154 | 71 | 53 | 50 | 60 | 141 | 147 | 161 | 168 | 131 | 186 |
| 240° C. | 60° C. | 170 | 95 | 143 | 63 | 80 | 156 | 146 | 149 | 160 | 153 | 164 |
| 240° C. | 80° C. | 48 | 31 | 45 | 50 | 25 | 74 | 83 | 76 | 80 | 78 | 91 |
| 180° C. | 60° C. | 190 | 160 | 116 | 60 | 155 | 154 | 150 | 163 | 185 | 140 | 186 |

Adhesion Strength (aluminum plate) (N/25 mm)

| Press molding temperature | Measuring temperature | 1 | 2 | 3 | 4 | 5 | 6 | 7 | 8 | 9 | 10 | 11 |
|---|---|---|---|---|---|---|---|---|---|---|---|---|
| 240° C. | 23° C. | 185 | 132 | 130 | 76 | 140 | 175 | 173 | 180 | 203 | 172 | 182 |
| 180° C. | 23° C. | 230 | 170 | 125 | 82 | 160 | 179 | 172 | 185 | 206 | 172 | 187 |
| 160° C. | 23° C. | 208 | 82 | 50 | 55 | 72 | 170 | 160 | 183 | 196 | 165 | 178 |
| 240° C. | 60° C. | 210 | 104 | 159 | 62 | 53 | 177 | 162 | 182 | 195 | 160 | 184 |
| 240° C. | 80° C. | 55 | 25 | 56 | 53 | 23 | 80 | 89 | 80 | 84 | 83 | 96 |
| 180° C. | 60° C. | 235 | 170 | 128 | 64 | 164 | 174 | 167 | 187 | 203 | 168 | 183 |

TABLE 2

| | Comparative Examples | | | |
|---|---|---|---|---|
| | 1 | 2 | 3 | 4 |
| Compositions (parts by mass) | | | | |
| (A1) | | | 100 | |
| (A2) | | 100 | | 40 |
| (A3) | | | | |
| (A4) | | | | |
| (A'5) | 100 | | | 60 |
| (B1) | 37.5 | 19 | 19 | 37.5 |
| (C1) | 50 | | | 50 |
| (C'2) | | 25 | | |
| (C'3) | | | 25 | |
| (D1) | 100 | | | 100 |
| (E1) | | | | |
| (E2) | | | | |
| (E3) | | | | |
| (E4) | | | | |
| Melt flow rate MFR (g/10 min) | 1 | 4 | 2 | 19 |
| Type A hardness | 69 | 73 | 72 | 73 |
| Tensile strength at break (MPa) | 12.1 | 13 | 15 | 5 |
| Tensile elongation at break (%) | 680 | 800 | 860 | 80 |
| Compositions (parts by mass) | | | | |
| (A1) | | | 100 | |
| (A2) | | 100 | | 40 |
| (A3) | | | | |
| (A4) | | | | |
| (A'5) | 100 | | | 60 |
| (B1) | 37.5 | 19 | 19 | 37.5 |
| (C1) | 50 | | | 50 |
| (C'2) | | 25 | | |
| (C'3) | | | 25 | |
| (D1) | 100 | | | 100 |
| (E1) | | | | |
| (E2) | | | | |
| (E3) | | | | |
| (E4) | | | | |

Adhesion Strength (glass plate) (N/25 mm)

| Press molding temperature | Measuring temperature | 1 | 2 | 3 | 4 |
|---|---|---|---|---|---|
| 240° C. | 23° C. | 30 | 1 | 20 | 76 |
| 180° C. | 23° C. | 5 | — | 12 | 73 |
| 160° C. | 23° C. | — | — | 3 | 84 |
| 240° C. | 60° C. | 2 | — | 5 | 13 |
| 240° C. | 80° C. | — | — | 1 | 2 |
| 180° C. | 60° C. | 1 | — | 3 | 15 |

Adhesion Strength (aluminum plate) (N/25 mm)

| Press molding temperature | Measuring temperature | 1 | 2 | 3 | 4 |
|---|---|---|---|---|---|
| 240° C. | 23° C. | 31 | 1 | 23 | 80 |
| 180° C. | 23° C. | 5 | — | 11 | 80 |
| 160° C. | 23° C. | — | — | 5 | 75 |
| 240° C. | 60° C. | 3 | — | 4 | 11 |
| 240° C. | 80° C. | 1 | — | — | 3 |
| 180° C. | 60° C. | — | — | 2 | 81 |

As seen from Table 1, the thermoplastic polymer compositions obtained in Examples 1 to 11 are excellent in flexibility, mechanical properties, moldability, and particularly in heat resistance, and exhibit high adhesion to ceramics, metals, and synthetic resins without the treatment with a primer, thereby enabling the thermoplastic polymer compositions to adhere to ceramics and metals by a press molding even at 190° C. or lower, for example, at 180° C. or 160° C. Further, it can be seen that the laminates produced at 180° C. maintain good adhesion strength even under exposure to an environment at 60° C. or higher, showing that the thermoplastic polymer compositions are excellent in the heat resistance. Examples 1 and 2 show that the adhesion strength to be obtained at a press molding temperature of 160° C. is drastically improved and the heat resistance is further enhanced by increasing the content of the polar group-containing polypropylene resin (C) from 15 parts by mass to 25 parts by mass, each based on 100 parts by mass of the thermoplastic elastomer (A). Examples 6 to 11 show that the moldability is further improved by the use of the tackifier resin (E), while preventing the adhesion strength to be obtained at the press molding temperature and the adhesion strength to be obtained under exposure to high temperature environment from decline.

As seen from Comparative Examples 1 and 3 of Table 2, in which the thermoplastic elastomer (A'5) wherein the total content of 1,2-bonding and 3,4-bonding in isoprene units, butadiene units, or isoprene/butadiene units is less than 40 mol % is used in place of the thermoplastic elastomer (A) (Comparative Example 1) and the polar group-containing polyethylene resin (C'3) is used in place of the polar group-containing polypropylene resin (C) (Comparative Example 3), the adhesion strength obtained by press molding at 180° C. or lower is drastically lowered and the adhesion strength (heat resistance) is also drastically lowered under exposure to an environment at 60° C. or higher. In Comparative Example 2 wherein the polypropylene resin (C'2) having no polar group is used in place of the polar group-containing polypropylene resin (C), only the adhesion strength insufficient for practical use is obtained in any of the temperature conditions.

In Comparative Example 4 wherein the content of the polar group-containing polypropylene resin (C) exceeds 100 parts by mass per 100 parts by mass of the thermoplastic elastomer (A), the adhesion strength comparative to those of Examples is obtained by the press molding at 160° C., but the mechanical properties, such as the tensile strength at break and the tensile elongation at break, are poor and the heat resistance is also drastically lowered.

INDUSTRIAL APPLICABILITY

The thermoplastic polymer composition of the invention is useful as adhesives for joining glass with aluminum sash or metal openings of windows of automobiles and buildings or joining glass with metal frame of photovoltaic modules.

The molded product comprising the thermoplastic polymer composition of the invention is useful as housing materials for electronic or electric appliances, OA equipments, household appliances, and automotive parts, specifically as housing materials for large-sized display, notebook computer, mobile phone, PHS, PDA (personal digital assistant, such as electric organizer), electronic dictionary, video camera, digital still camera, portable radio cassette player, and inverter.

The thermoplastic polymer composition is also useful in a wide application as a molded product or structural member to be adhered to glass, for example, a window molding or gasket for automobiles and buildings, a sealant for glass, and an anti-corrosion material.

The thermoplastic polymer composition is further useful as the separator of rechargeable batteries for use in personal digital assistants, such as notebook computer, mobile phone, and video camera, hybrid vehicle, and fuel cell vehicle.

What is claimed is:

1. A thermoplastic polymer composition, comprising:
    100 parts by mass of a thermoplastic elastomer;
    1 to 45 parts by mass of a polyvinyl acetal resin per 100 parts of the thermoplastic elastomer, wherein the polyvinyl acetal resin is obtained by acetalizing a polyvinyl alcohol having an average degree of polymerization of 100 to 4,000 to a degree of acetalization of 55 to 88% by mole; and
    20 to 100 parts by mass of a polar group-comprising polypropylene resin per 100 parts of the thermoplastic elastomer,
    wherein the thermoplastic elastomer is a block copolymer or a hydrogenated product of the block copolymer, the block copolymer comprises a polymer block comprising an aromatic vinyl compound unit and a polymer block comprising an isoprene unit, a butadiene unit, or an isoprene/butadiene unit, and a total of a content of 1,2-bonding and a content of 3,4-bonding is 40 mol % or more,
    wherein the polar group-comprising polypropylene resin comprises, in polymerized form, from 0 to 45 mol % of α-olefin units other than propylene, based on a total of constitutional units in the polar group-containing polypropylene resin,
    wherein a melt flow rate (MFR) of the polar-group comprising polypropylene resin is 0.1 to 100 g/10 min, when measured at 230° C. under a load of 2.16 kg (21.18 N),
    wherein a hardness of the thermoplastic polymer composition is 93 or less, when measured according to JIS-A method of JIS K 6253, and
    wherein the thermoplastic polymer composition has both an adhesion strength on a glass plate and an adhesion strength on an aluminum plate of 20 N/25mm or more respectively, wherein the adhesion strength is determined by:
    washing both surfaces a glass plate with an aqueous solution of surfactant, methanol, acetone, and distilled water successively in this order, and washing both sides of an aluminum plate with an aqueous solution of surfactant and distilled water successively in this order;
    drying the glass plate and the aluminum plate;
    piling the glass plate thus treated, each of a sheet of the thermoplastic polymer composition and a polyethylene terephthalate (PET) sheet having a thickness of 50 μm at the center of a metal spacer in this order;
    piling the aluminum plate thus treated, each of a sheet of the thermoplastic polymer composition and a polyethylene terephthalate (PET) sheet having a thickness of 50 μm at the center of a metal spacer in this order;
    placing the piled sheets together with the metal spacer between two sheets of polytetrafluoroethylene, which is then put between two metal plates and compression-molded with a press molding machine at a temperature 180° C. under a load of 2 N/mm$^2$ for 3 min, thereby obtaining a laminate of PET/thermoplastic polymer composition/glass plate or a laminate of PET/thermoplastic polymer composition/aluminum plate;
    measuring the peeling strength between the thermoplastic polymer composition layer and the glass plate and the peeling strength between the thermoplastic polymer composition layer and the aluminum plate at a peel angle of 180°, a tensile speed of 50 mm/min and a temperature of 60° C. according to JIS K 6854-2.

2. The thermoplastic polymer composition according to claim 1, further comprising 0.1 to 300 parts by mass of a softener.

3. The thermoplastic polymer composition according to claim 1, further comprising 1 to 100 parts by mass of a tackifier resin.

4. The thermoplastic polymer composition according to claim 1, wherein the polyvinyl acetal resin is a polyvinyl butyral.

5. The thermoplastic polymer composition according to claim 1, wherein the polypropylene resin is a carboxylic acid-modified polypropylene resin.

6. The thermoplastic polymer composition according to claim 1, wherein the block copolymer comprises a polymer block comprising an aromatic vinyl compound unit and a polymer block comprising an isoprene unit.

7. The thermoplastic polymer composition according to claim 1, wherein the block copolymer comprises a polymer block comprising an aromatic vinyl compound unit and a polymer block comprising a butadiene unit.

8. The thermoplastic polymer composition according to claim 1, wherein the block copolymer comprises a polymer block comprising an aromatic vinyl compound unit and a polymer block comprising an isoprene/butadiene unit.

9. The thermoplastic polymer composition according to claim 1, wherein a total of a content of 1,2-bonding and a content of 3,4-bonding is 40 to 95 mol %.

10. The thermoplastic polymer composition according to claim 1, wherein a total of a content of 1,2-bonding and a content of 3,4-bonding is 50 to 85 mol %.

11. The thermoplastic polymer composition according to claim 1, wherein the polyvinyl acetal resin is obtained by acetalizing a polyvinyl alcohol having an average degree of polymerization of 100 to 3,000 to a degree of acetalization of 60 to 88% by mole.

12. The thermoplastic polymer composition according to claim 1, wherein the polyvinyl acetal resin is obtained by acetalizing a polyvinyl alcohol having an average degree of polymerization of 250 to 2,000 to a degree of acetalization of 75 to 85% by mole.

13. The thermoplastic polymer composition according to claim 1, having both an adhesion strength on a glass plate and an adhesion strength on an aluminum plate of 20 N/25mm or more respectively, wherein the adhesion strength is determined by:
washing both surfaces a glass plate with an aqueous solution of surfactant, methanol, acetone, and distilled water successively in this order, and washing both sides of an aluminum plate with an aqueous solution of surfactant and distilled water successively in this order;

drying the glass plate and the aluminum plate;
piling the glass plate thus treated, each of a sheet of the thermoplastic polymer composition and a polyethylene terephthalate (PET) sheet having a thickness of 50 μm at the center of a metal spacer in this order;
piling the aluminum plate thus treated, each of a sheet of the thermoplastic polymer composition and a polyethylene terephthalate (PET) sheet having a thickness of 50 μm at the center of a metal spacer in this order;
placing the piled sheets together with the metal spacer between two sheets of polytetrafluoroethylene, which is then put between two metal plates and compression-molded with a press molding machine at a temperature 240° C. under a load of 2 N/mm$^2$ for 3 min, thereby obtaining a laminate of PET/thermoplastic polymer composition/glass plate or a laminate of PET/thermoplastic polymer composition/aluminum plate;
measuring the peeling strength between the thermoplastic polymer composition layer and the glass plate and the peeling strength between the thermoplastic polymer composition layer and the aluminum plate at a peel angle of 180°, a tensile speed of 50 min/min, and a temperature of 60° C. according to JIS K 6854-2.

14. The thermoplastic polymer composition according to claim 1, comprising 100 parts by mass of the thermoplastic elastomer, 5 to 45 parts by mass of the polyvinyl acetal resin, and 20 to 70 parts by mass of the polypropylene resin.

15. The thermoplastic polymer composition according to claim 14, comprising 100 parts by mass of the thermoplastic elastomer, 10 to 45 parts by mass of the polyvinyl acetal resin, and 20 to 60 parts by mass of the polypropylene resin.

16. The thermoplastic polymer composition according to claim 14, comprising 100 parts by mass of the thermoplastic elastomer, 15 to 45 parts by mass of the polyvinyl acetal resin, and 20 to 30 parts by mass of the polypropylene resin.

17. A molded product comprising the thermoplastic polymer composition according to claim 1.

18. The molded product according to claim 17, wherein the thermoplastic polymer composition is adhered to at least one material selected from the group consisting of a ceramic, a metal, and a synthetic resin.

19. The molded product according to claim 18, wherein the thermoplastic polymer composition is adhered to at least one material selected from a ceramic and a metal.

20. The molded product according to claim 17, wherein the molded product comprises at least two materials selected from the group consisting of a ceramic, a metal, and a synthetic resin adhered to each other via the thermoplastic polymer composition.

* * * * *